United States Patent
Eo et al.

(10) Patent No.: US 11,105,399 B2
(45) Date of Patent: Aug. 31, 2021

(54) DCT FOR VEHICLE

(71) Applicants: Hyundai Motor Company, Seoul (KR); Kia Motors Corporation, Seoul (KR)

(72) Inventors: Soon Ki Eo, Ansan-si (KR); Seong Wook Hwang, Gunpo-si (KR); Ma Ru Kang, Yongin-si (KR); Min Ho Chae, Incheon (KR); Sun Sung Kwon, Anyang-si (KR); Chon Ok Kim, Yongi-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 224 days.

(21) Appl. No.: 16/513,240

(22) Filed: Jul. 16, 2019

(65) Prior Publication Data
US 2020/0271197 A1 Aug. 27, 2020

(30) Foreign Application Priority Data
Feb. 27, 2019 (KR) .......................... 10-2019-0022862

(51) Int. Cl.
*F16H 37/06* (2006.01)
*F16H 3/085* (2006.01)
*F16H 3/00* (2006.01)

(52) U.S. Cl.
CPC ............. *F16H 3/085* (2013.01); *F16H 3/006* (2013.01); *F16H 2200/006* (2013.01); *F16H 2200/0008* (2013.01); *F16H 2200/0069* (2013.01)

(58) Field of Classification Search
CPC .................................. F16H 3/006; F16H 3/085
See application file for complete search history.

(56) References Cited

U.S. PATENT DOCUMENTS

| | | | |
|---|---|---|---|
| 8,757,019 B2* | 6/2014 | Singh ...................... | F16H 3/006 74/330 |
| 2006/0230854 A1* | 10/2006 | Enstrom .................. | B60K 6/36 74/331 |
| 2006/0266144 A1* | 11/2006 | Schafer ................... | F16H 3/006 74/340 |

(Continued)

FOREIGN PATENT DOCUMENTS

KR    10-2010-0088731 A    8/2010

*Primary Examiner* — Jake Cook
(74) *Attorney, Agent, or Firm* — Morgan, Lewis & Bockius LLP

(57) ABSTRACT

A dual-clutch transmission may include: a first input shaft and a second input shaft mounted concentrically to the first input shaft; a first clutch mounted to the first input shaft to selectively transmit power to the first input shaft; a second clutch mounted to the second input shaft to selectively transmit power to the second input shaft; a first output shaft and a second output shaft mounted in parallel with the first input shaft and the second input shaft; an input shaft connection device provided to switch a power transmitting and a blocking state between the first input shaft and the second input shaft by use of a selection output shaft; a plurality of drive gears mounted on the first input shaft and the second input shaft; and a plurality of driven gears mounted on the first output shaft and the second output shaft engaged with the plurality of drive gears to form each shifting stage.

8 Claims, 14 Drawing Sheets

(56) References Cited

U.S. PATENT DOCUMENTS

| | | | |
|---|---|---|---|
| 2010/0319473 A1* | 12/2010 | Singh | F16H 3/006 74/331 |
| 2011/0167957 A1* | 7/2011 | Kato | F16H 61/0059 74/665 E |
| 2011/0214533 A1* | 9/2011 | Koyama | B60W 10/113 74/665 A |
| 2016/0084351 A1* | 3/2016 | Lee | F16H 3/091 74/330 |
| 2018/0106332 A1* | 4/2018 | Lee | B60K 6/547 |

* cited by examiner

FIG. 13

● : Operation
× : Non-operation

| Shift stage | CL1 | CL2 | 5S 5 | 5S N | 2&8S 8 | 2&8S 2 | 2&8S N | 3&7S 3 | 3&7S 7 | 3&7S N | 4&6S 6 | 4&6S 4 | 4&6S N | RS R | RS N | ST 4 | ST N |
|---|---|---|---|---|---|---|---|---|---|---|---|---|---|---|---|---|---|
| First stage | ● | × | × | ● | × | ● | × | × | × | ● | × | × | ● | × | ● | ● | × |
| Second stage | × | ● | × | ● | × | ● | × | × | × | ● | × | × | ● | × | ● | × | ● |
| Third stage | ● | × | × | ● | × | × | ● | ● | × | × | × | × | ● | × | ● | × | ● |
| Fourth stage | × | ● | ● | ● | × | × | ● | × | × | ● | × | ● | × | × | ● | × | ● |
| Fifth stage | ● | × | × | × | × | × | ● | × | × | ● | ● | × | × | × | ● | × | ● |
| Sixth stage | × | ● | × | ● | × | × | ● | × | ● | × | × | × | × | × | ● | × | ● |
| Seventh stage | ● | × | ● | ● | × | × | × | × | × | ● | × | × | ● | × | ● | × | ● |
| Eighth stage | × | ● | × | × | × | × | ● | × | ● | ● | × | × | ● | × | ● | × | × |
| A stage | × | ● | × | ● | × | × | ● | × | × | × | × | × | ● | × | ● | ● | × |
| B stage (ninth stage) | × | × | × | ● | × | × | ● | × | × | ● | × | × | ● | × | ● | ● | × |
| R stage | ● | × | × | ● | × | × | ● | × | × | ● | × | × | ● | ● | × | × | ● |

DCT FOR VEHICLE

CROSS REFERENCE TO RELATED APPLICATION

The present application claims priority to Korean Patent Application No. 10-2019-0022862 filed on Feb. 27, 2019, the entire contents of which is incorporated herein for all purposes by this reference.

BACKGROUND OF THE DISCLOSURE

Field of the Disclosure

The present invention relates to a dual-clutch transmission (DCT) for a vehicle, and more particularly, the present invention relates to a technique related to a DCT structure that can reduce the whole length relatively while implementing a plurality of shifting stages.

Description of Related Art

In a front engine front drive (FF) vehicle, in many cases, an engine and a transmission are combined to form an assembly in the lateral direction of the vehicle. In the instant case, since the whole length of the assembly of the engine and transmission is configured to be received within the width in a lateral direction of an engine compartment of the vehicle, the whole length reduction of the assembly of the engine and transmission is one of the most important goals in powertrain design.

On the other hand, since the output and fuel efficiency characteristics vary greatly depending on the operating region of the engine, it is desirable to operate the engine in the optimum operating region as much as possible. To achieve this, a transmission connecting the engine and the drive wheels should be capable of providing as many shifting stages as possible.

Generally, as the shifting stages which is provided by the transmission increases, the whole length of the transmission becomes longer. Therefore, the shifting stages increase of the transmission and the vehicle mountability has a tradeoff relationship which is incompatible with each other.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a dual-clutch transmission (DCT) for a vehicle configured for providing a plurality of shifting stages and having a relatively short total length to improve fuel efficiency of a vehicle and ensuring vehicle mountability.

A DCT for a vehicle of the present invention in order achieve the above objects may include: a first input shaft and a second input shaft mounted concentrically to the first input shaft; a first clutch mounted to the first input shaft to selectively transmit power to the first input shaft; a second clutch mounted to the second input shaft to selectively transmit power to the second input shaft; a first output shaft and a second output shaft mounted in parallel with the first input shaft and the second input shaft; an input shaft connection device provided to switch a power transmitting state and a blocking state between the first input shaft and the second input shaft by use of a selection output shaft, which is one of the first output shaft and the second output shaft; a plurality of drive gears mounted on the first input shaft and the second input shaft; and a plurality of driven gears mounted on the first output shaft and the second output shaft engaged with the plurality of drive gears to form each shifting stage.

The drive gears for the shifting stage is configured to be mounted on and rotated with the first input shaft or the second input shaft; the driven gears for the shifting stage is configured to be mounted on the first output shaft or the second output shaft to be rotatable; a plurality of synchronizers for shifting stages is configured to be mounted on the first output shaft and the second output shaft for selectively connecting the driven gears for the shifting stage to or from the first output shaft or the second output shaft.

The input shaft connection device may include: a sleeve synchronizer provided to selectively connect between two driven gears among the plurality of drive gears, the two drive gears mounted adjacent to each other on the selection output shaft.

The plurality of drive gears for the shifting stage and driven gears for the shifting stage is configured to be mounted to implement remaining shifting stages except for a lowest shifting stage having the greatest transmission shift ratio and a highest shifting stage having the smallest transmission shift ratio among the series of the shifting stages which is configured to be implemented by the DCT; and the lowest shifting stage and the highest shifting stage is configured to be implemented by use of the remaining drive gears for the shifting stage and driven gears for the shifting stage while the input shaft connection device connects the first input shaft and the second input shaft.

The first input shaft is provided with the drive gears for the shifting stage for implementing odd shifting stages among the series of the shifting stages; the second input shaft is provided with the drive gears for the shifting stage for implementing even shifting stages among the series of the shifting stages; the selection output shaft is configured to be the second output shaft; and the sleeve synchronizer is configured to be mounted to selectively connect between the driven gears for the shifting stage mounted on the second output shaft for implementing odd shifting stages and the driven gears for the shifting stage mounted on the second output shaft for implementing even shifting stages.

The first input shaft is provided with a drive gear for a third stage, a drive gear for a fifth stage and a drive gear for a seventh stage; the second input shaft is provided with a drive gear for a second stage, a drive gear for a fourth stage and a drive gear for a sixth and eighth stage; the first output shaft is provided with a driven gear for the second stage, a driven gear for the fifth stage and a driven gear for the eighth stage; and the second output shaft is provided with a driven gear for the third stage, a driven gear for the fourth stage, a driven gear for the sixth stage and a driven gear for the seventh stage.

The sleeve synchronizer is configured to be mounted to selectively connect between the driven gear for the third stage and the driven gear for the fourth stage.

A reverse idler shaft mounted in parallel with the second output shaft; a reverse driven gear mounted on the reverse idler shaft; and a reverse synchronizer provided to selectively connect the reverse driven gear to or from the reverse idler shaft is configured to be further included.

The DCT of the vehicle of the present invention can provide a plurality of shifting stages and configure a short whole length of the transmission, improving vehicle mountability of the transmission and contributing to the improvement of fuel efficiency of the vehicle by providing a plurality of shifting stages.

The methods and apparatuses of the present invention have other features and advantages which is to be apparent from or are set forth in more detail in the accompanying drawings, which are incorporated wherein, and the following Detailed Description, which together serve to explain predetermined principles of the present invention.

BRIEF DESCRIPTION OF THE DRAWINGS

FIG. 13 is an operation table that summarizes operation whether of a clutch and a synchronizer at each shifting stage implemented by the various exemplary embodiments of FIG. 1.

Figure 1:
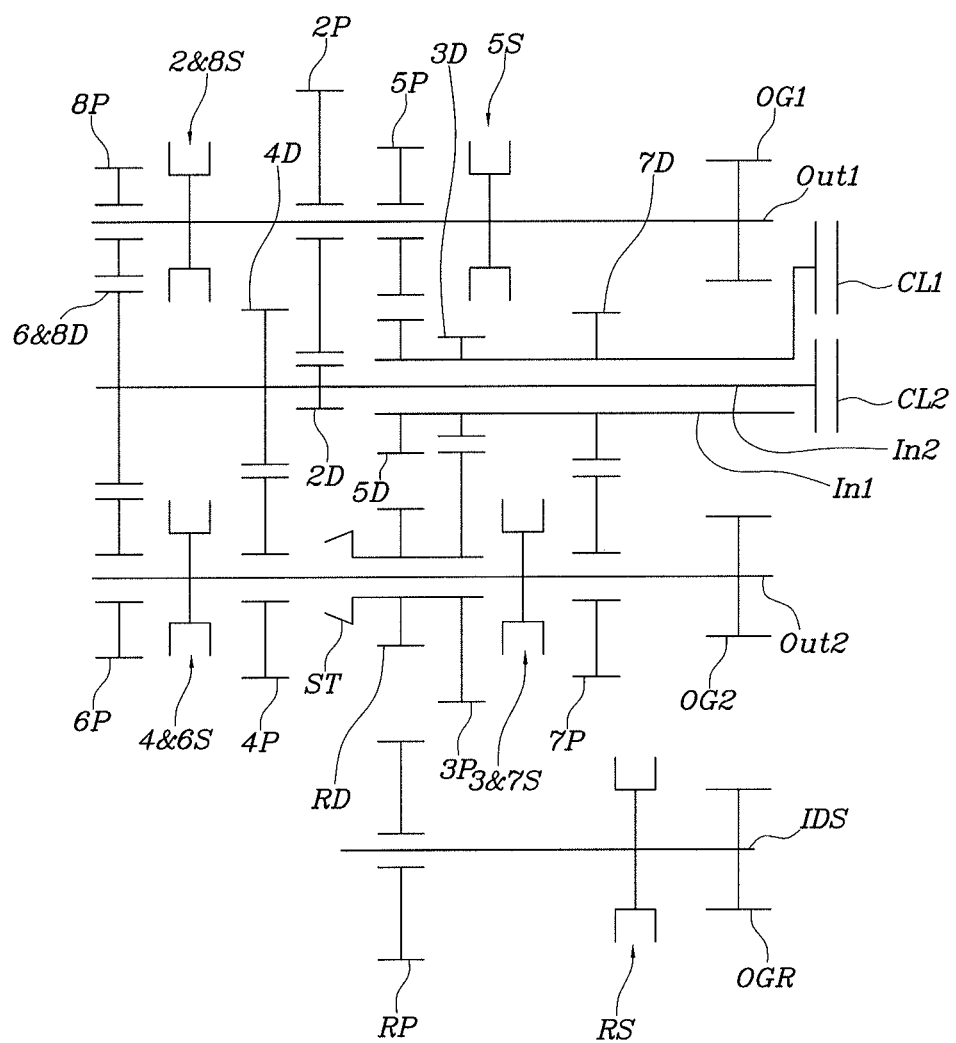
FIG. 1 is a drawing showing the various exemplary embodiments of a dual-clutch transmission (DCT) for a vehicle according to an exemplary embodiment of the present invention.

It is configured to be understood that the appended drawings are not necessarily to scale, presenting a somewhat simplified representation of features illustrative of the predetermined principles of the present invention. The predetermined design features of the present invention as disclosed wherein, including, for example, predetermined dimensions, orientations, locations, and shapes is to be determined in part by the particularly intended application and use environment.

In the figures, reference numbers refer to a same or equivalent portions of the present invention throughout the several figures of the drawing.

DETAILED DESCRIPTION OF THE DISCLOSURE

Reference will now be made in detail to embodiments of the present invention(s), examples of which are illustrated in the accompanying drawings and described below. While the present invention(s) is to be described in conjunction with exemplary embodiments of the present invention, it is to be understood that the present description is not intended to limit the present invention(s) to those exemplary embodiments. On the other hand, the present invention(s) is/are intended to cover not only the various exemplary embodiments of the present invention, but also alternatives, modifications, equivalents and other embodiments, which is configured to be included with the spirit and scope of the present invention as defined by the appended claims.

An exemplary embodiment of the present invention is to be described in detail with respect to the attached drawing as follows.

Referring to FIG. 1 to FIG. 13, the exemplary embodiment of a DCT for a vehicle according to an exemplary embodiment of the present invention is including, a first input shaft IN1 and a second input shaft IN2 mounted concentrically; a first clutch CL1 provided to transmit power to the first input shaft IN1; a second clutch CL2 provided to transmit power to the second input shaft IN2; a first output shaft OUT1 and a second output shaft OUT2 mounted in parallel with the first input shaft IN1 and the second input shaft IN2; an input shaft connection device provided to switch a power transmitting state and a blocking state between the first input shaft IN1 and the second input shaft IN2 by use of a selection output shaft, which is one of the first output shaft OUT1 and the second output shaft OUT2; a plurality of drive gears for a shifting stage mounted on the first input shaft IN1 and the second input shaft IN2; and a plurality of driven gears for a shifting stage mounted on the first output shaft OUT1 and the second output shaft OUT2 engaged with the plurality of drive gears to form each shifting stage.

That is, the present invention may implement shifting stages through the drive gears for the shifting stage and the driven gears for the shifting stage. The first input shaft IN1 is configured to be switched to a state of being configured to transmit the power received from the first clutch CL1 to the second input shaft IN2 or not by the input shaft connection device. In a same manner, the second input shaft IN2 is configured to be switched to a state of being configured to transmit the power received from the second clutch CL2 to the first input shaft IN1 or not.

The drive gears for the shifting stage is configured to be mounted on and rotated with the first input shaft IN1 or the second input shaft IN2, the driven gears for the shifting stage is configured to be mounted on the first output shaft OUT1 or the second output shaft OUT2 to be rotatable, and to selectively connect the driven gears for the shifting stage to or from the first output shaft OUT1 or second output shaft OUT2, a plurality of synchronizers for shifting stages is provided at the first output shaft OUT1 and the second output shaft OUT2.

Therefore, when one of the driven gear for the shifting stage is connected to the first output shaft OUT1 or the second output shaft OUT2 by the synchronizer for the shifting stage, the shifting stage implemented by the driven gear for the shifting stage becomes the shifting stage which is implemented by the current DCT.

The input shaft connection device includes a sleeve synchronizer ST, which can selectively connect between two driven gears for the shifting stage mounted shaft adjacent to each other on the selection output.

The plurality of drive gears for the shifting stage and driven gears for the shifting stage is configured to be mounted to implement the remaining shifting stages except for a lowest shifting stage having the greatest transmission gear ratio and a highest shifting stage having the smallest transmission gear ratio among the series of shifting stages which is configured to be implemented by the DCT.

For example, when the series of the shifting stages which is configured to be implemented by the DCT are a first to ninth stage, the lowest shifting stage having the greatest transmission gear ratio becomes the first stage and the highest shifting stage having the smallest transmission gear ratio becomes the ninth stage. The shifting stages which the plurality of drive gears for the shifting stage and driven gears for the shifting stage are paired with each other to directly form become a second stage to an eighth stage except for the first stage and the ninth stage.

The lowest shifting stage and the highest shifting stage is configured to be implemented by use of the remaining driver gears and driven gears for the shift in a state that the input shaft connection device connects the first input shaft IN1 and the second input shaft IN2.

For example, in the exemplary embodiment of the present invention, the first stage and the ninth stage are implemented by the remaining drive gears and driven gears for the shifting stage except for the drive gears for the shifting stage connected by the sleeve synchronizer ST and the driven gears for the shifting stage engaged with the drive gears for the shifting stage connected by the sleeve synchronizer ST among the drive gears for the shifting stage and the driven gears for the shifting stage used to implement the second stage to the eighth stage while the first input shaft IN1 and the second input shaft IN2 are connected to each other by the sleeve synchronizer ST.

In the exemplary embodiment of the present invention, the first input shaft IN1 is provided with the drive gears for the shifting stage for implementing odd shifting stages among the series of the shifting stages, the second input shaft IN2 is provided with the drive gears for the shifting stage for implementing even shifting stages among the series of the shifting stages, the selection output shaft is configured to be the second output shaft OUT2, and the sleeve synchronizer ST is configured to be mounted to selectively connect between the driven gears for the shifting stage for implementing the odd shifting stages and the driven gears for the shifting stage for implementing the even shifting stages mounted on the second output shaft OUT2.

That is, in the exemplary embodiment of FIG. 1, the first input shaft IN1 is provided with a drive gear for a third stage 3D, a drive gear for a fifth stage 5D and a drive gear for a seventh stage 7D, and the second input shaft IN2 is provided with a drive gear for a second stage 2D, a drive gear for a fourth stage 4D and a drive gear for a sixth and eighth stage 6&8D. The first output shaft OUT1 is provided with a driven gear for the second stage 2P, a driven gear for the fifth stage 5P and a driven gear for the eighth stage 8P, and the second output shaft OUT2 is provided with a driven gear for the third stage 3P, a driven gear for the fourth stage 4P, a driven gear for the sixth stage 6P and a driven gear for the seventh stage 7P.

Furthermore, the sleeve synchronizer ST is connecting selectively connect between the driven gear for the third stage 3P and the driven gear for the fourth stage 4P.

On the other hand, the exemplary embodiment of the present invention may further include: a reverse drive gear RD integrally connected to the driven gear for the third stage 3P, a reverse idler shaft IDS mounted in parallel with the second output shaft OUT2, a reverse driven gear RP mounted on the reverse idler shaft IDS, and a reverse synchronizer RS which connects or blocks the reverse driven gear RP to or from the reverse idler shaft IDS, implementing a reverse shifting stage as a R stage.

For reference, the first output shaft OUT1, the second output shaft OUT2 and the reverse idler shaft IDS is provided with a first output gear OG1, a second output gear OG2 and a reverse output gear OGR, respectively. The first output gear OG1, the second output gear OG2 and the reverse output gear OGR is configured to be commonly engaged with a ring gear of a differential so that each is configured to be configured to draw out the power to the differential.

In the exemplary embodiment of FIG. 1 as described above, FIGS. 2 to 12 explains to implement each shifting stage, and FIG. 13 summarizes the operations of the first clutch CL1, the second clutch CL2, the synchronizer for the shifting stage, the reverse synchronizer RS and the sleeve synchronizer ST as a table when implementing each shifting stage In FIG. 13, the synchronizer for the shifting stage is indicated by total four. That is, a synchronizer for the fifth stage 5S mounted on the first output shaft OUT1 for selectively connecting the driven gear for the fifth stage 5P to or from the first output shaft OUT1, a synchronizer for the second and eighth stage 2&8S mounted on the first output shaft OUT1 for selectively connecting the driven gear selectively connecting the second stage 2P or the driven gear for the eighth stage 8P to or from the first output shaft OUT1, a synchronizer for the third and seventh stage 3&7S mounted on the second output shaft OUT2 for selectively connecting the driven gear for the third stage 3P or the driven gear for the seventh stage 7P to or from the second output shaft OUT2, and a synchronizer for the fourth and sixth stage 4&6S mounted on the second output shaft OUT2 for selectively connecting the driven gear for the fourth stage 4P or the driven gear for the sixth stage 6P to or from the second output shaft OUT2, are included.

Among the shifting stages implemented by the DCT of the exemplary embodiment of the present invention, the second to eighth stages and the R stage are almost a same as operation of the conventional transmission, so a detailed description is omitted and hereafter, the implementation of the first stage, the A stage and the B stage will be described.

Herein, the A stage may normally form a transmission gear ratio between a transmission gear ratio of the seventh stage and a transmission gear ration of the eighth stage in the same transmission gear ratio arrangement as the present invention, and the B stage may form a transmission gear ratio corresponding to the ninth stage.

When the B stage is used in the ninth stage, as shown in FIG. 13, from the first stage to the eighth stage, it is configured to implement so-call "clutch to clutch" shift in which the shift is made by engaging the first clutch CL1 and the second clutch CL2 while crossing each other, so that torque interruption, which the torque being transmitted to drive wheels is disconnected during shifting, does not occur but the torque interruption may occur during shifting because the eighth stage and the ninth stage use a same second clutch CL2.

However, the eighth stage and the ninth stage are high shifting stages used when the vehicle speed is higher than a predetermined value, the ratio therebetween is not so large and the shift feeling is not a big problem due to running inertia of the vehicle.

Figure 2:
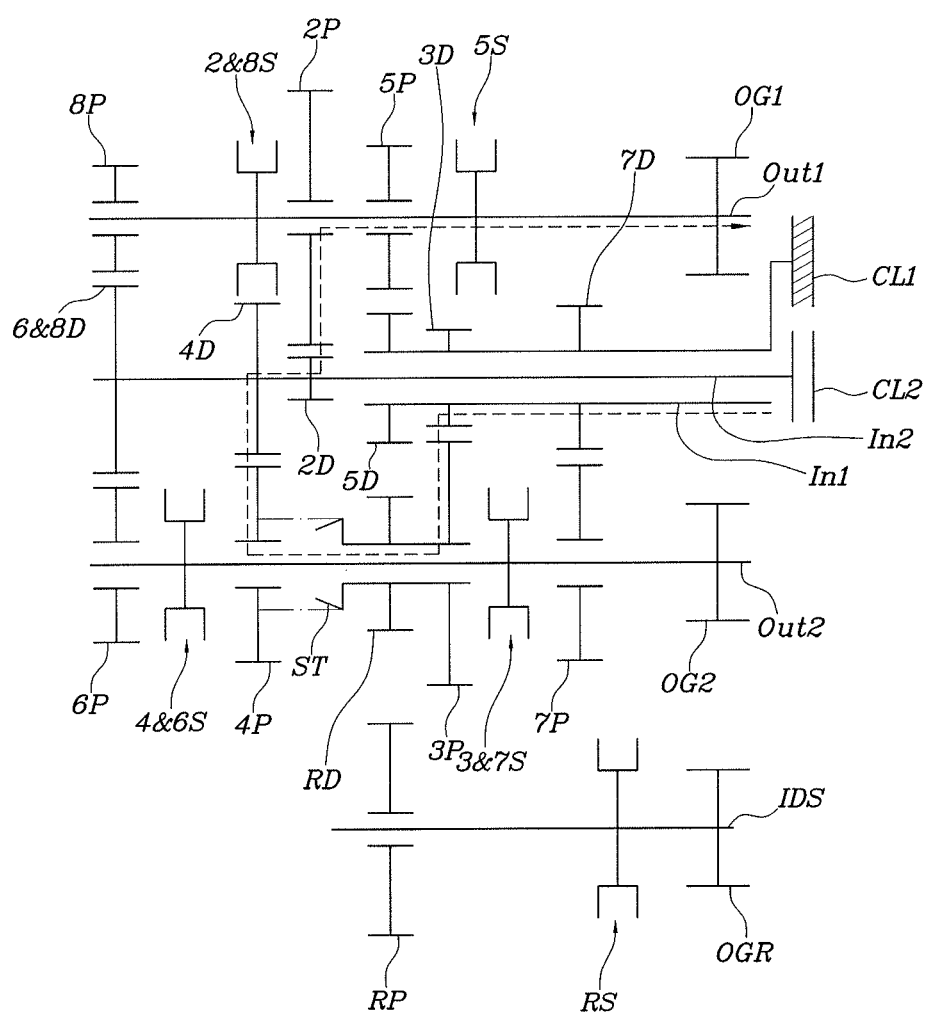
FIG. 2 is a drawing explaining the implementation of the first shifting stage by the various exemplary embodiments of FIG. 1.
Figure 3:
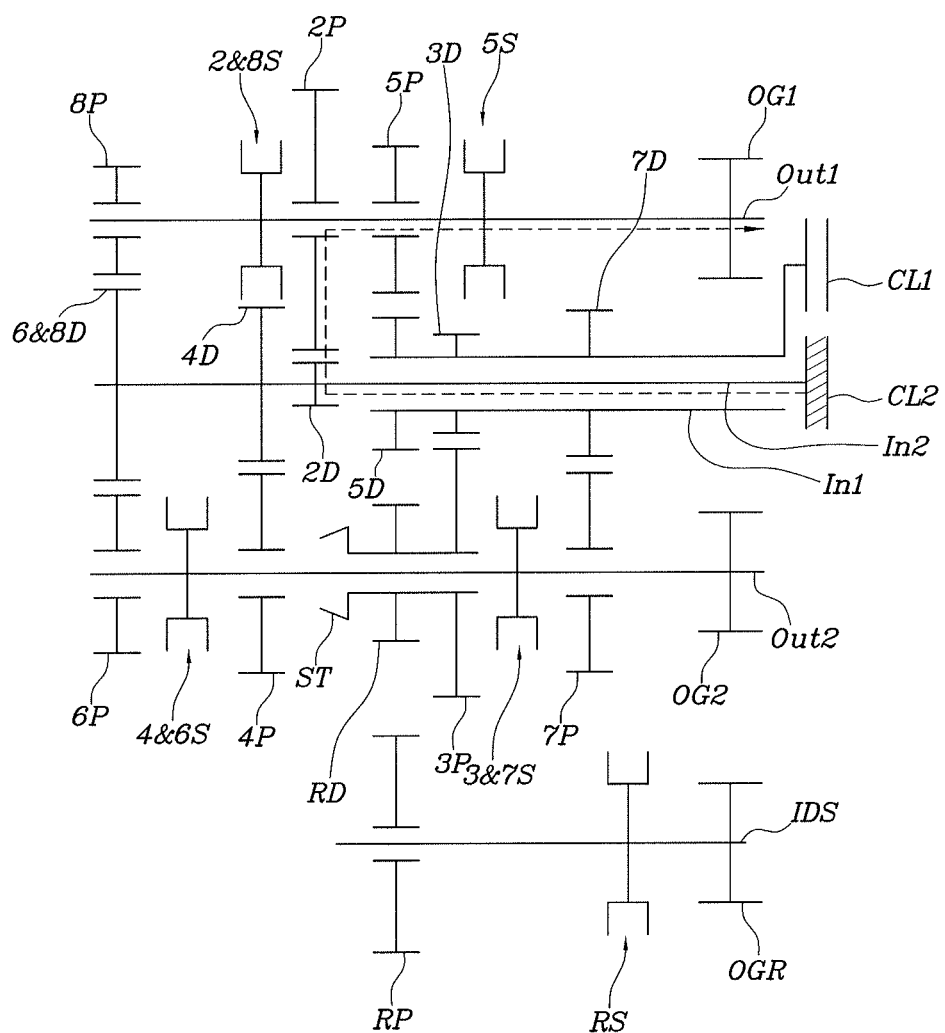
FIG. 3 is a drawing explaining the implementation of the second shifting stage by the various exemplary embodiments of FIG. 1.
Figure 4:
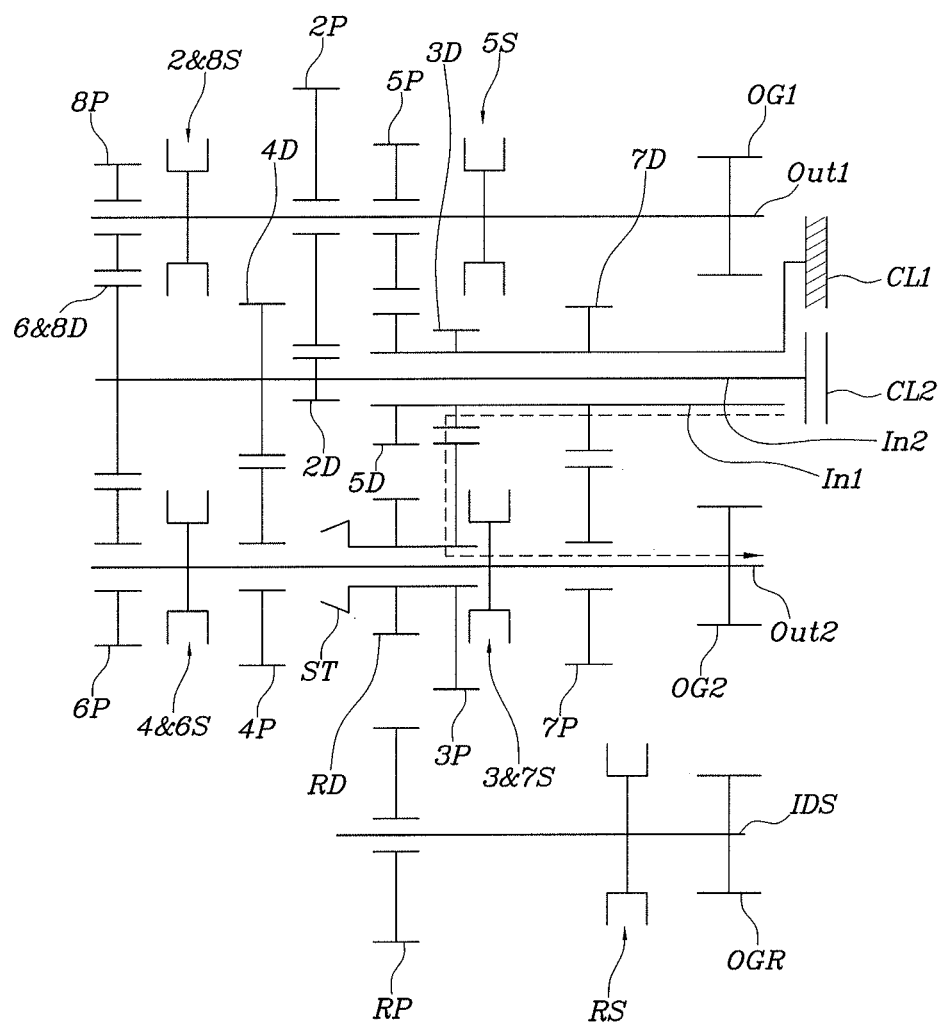
FIG. 4 is a drawing explaining the implementation of the third shifting stage by the various exemplary embodiments of FIG. 1.
Figure 5:
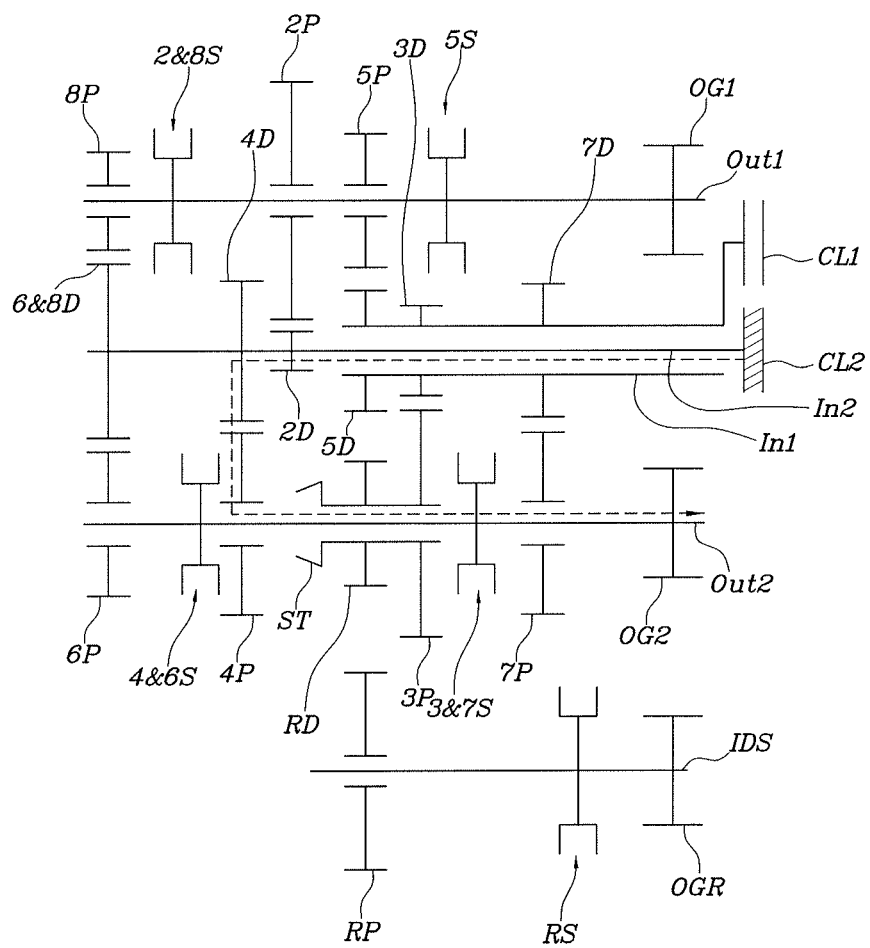
FIG. 5 is a drawing explaining the implementation of the fourth shifting stage by the various exemplary embodiments of FIG. 1.
Figure 6:
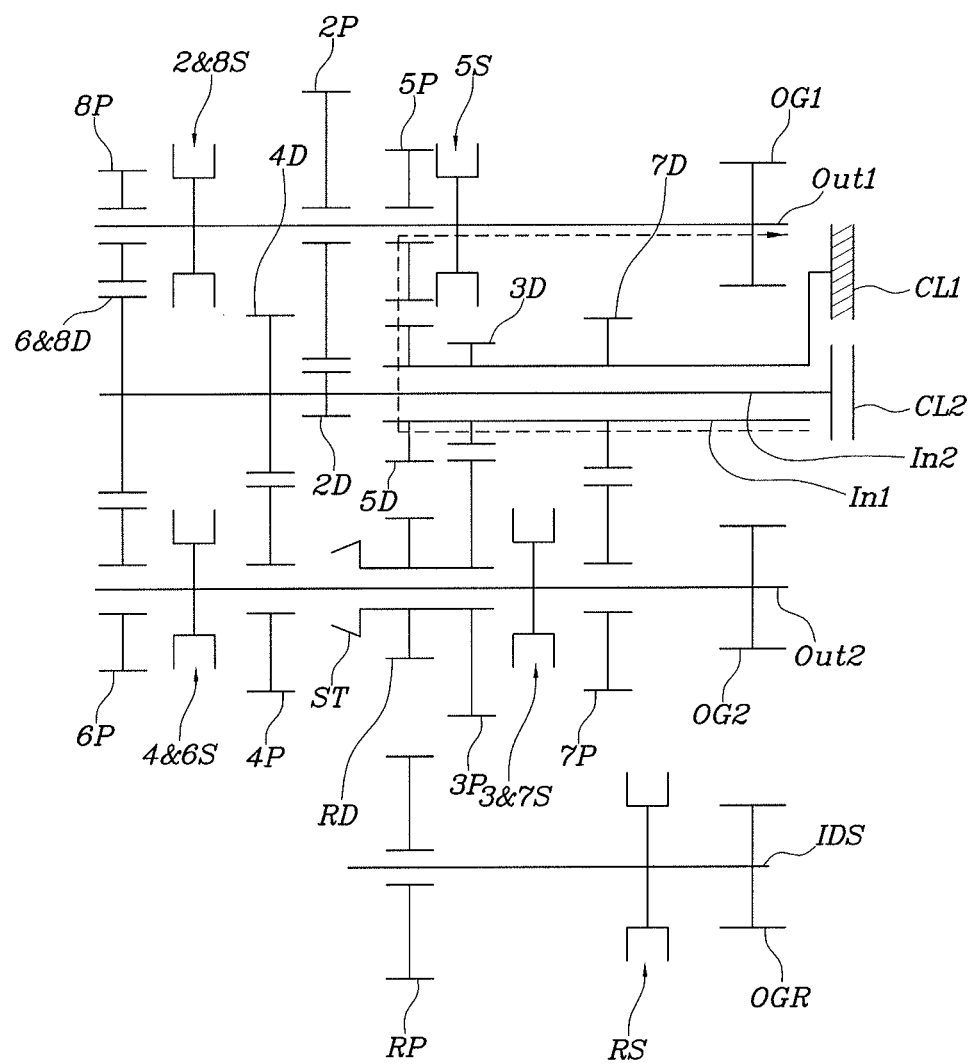
FIG. 6 is a drawing explaining the implementation of the fifth shifting stage by the various exemplary embodiments of FIG. 1.
Figure 7:
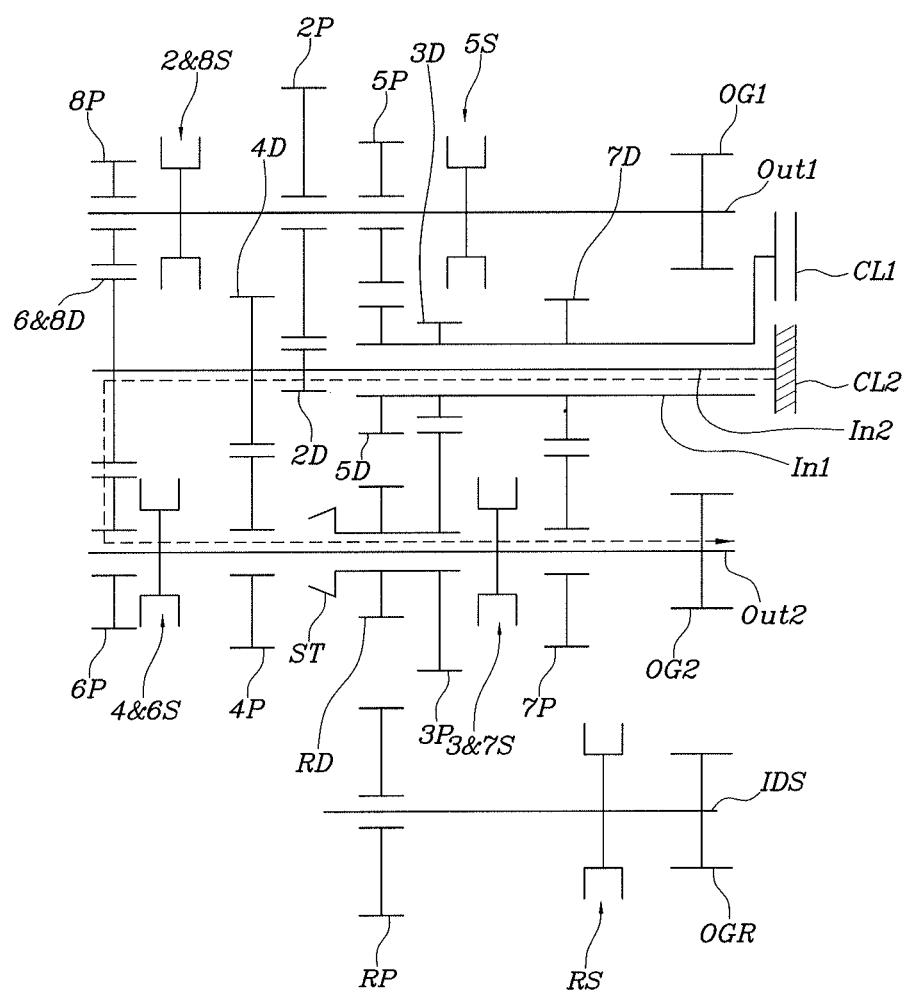
FIG. 7 is a drawing explaining the implementation of the sixth shifting stage by the various exemplary embodiments of FIG. 1.
Figure 8:
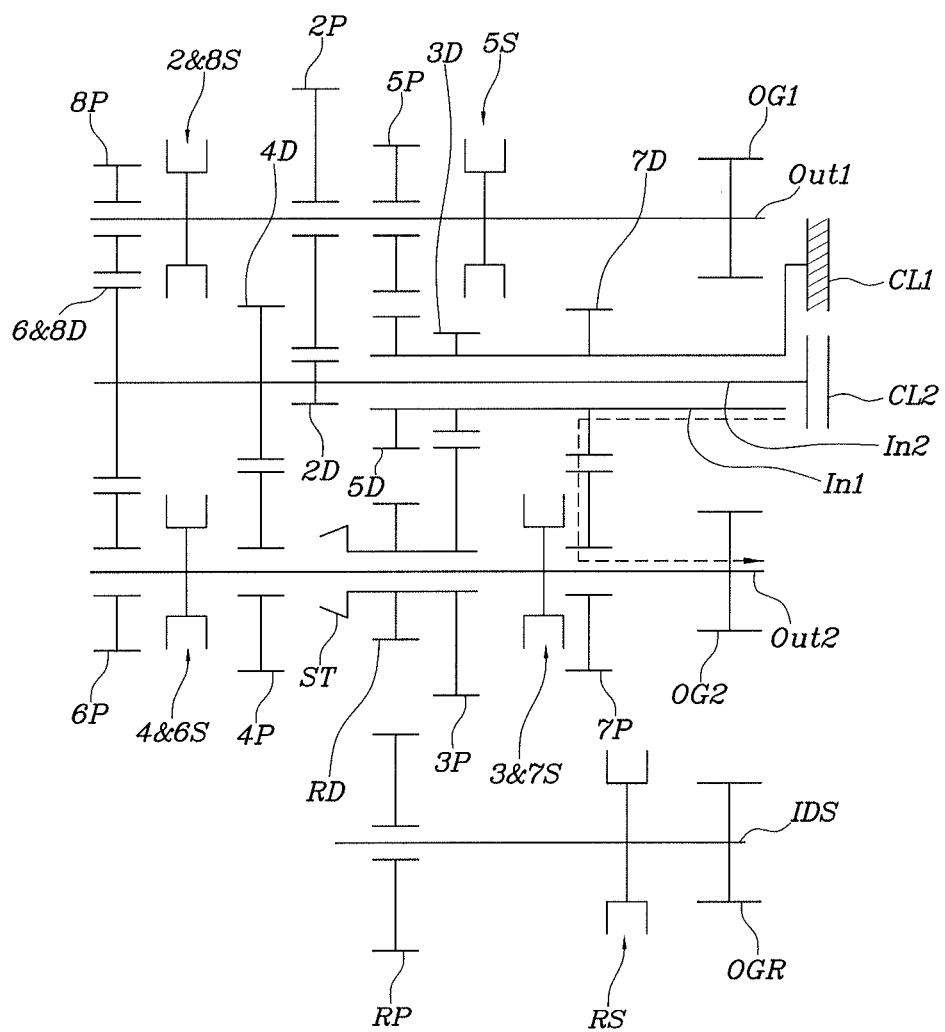
FIG. 8 is a drawing explaining the implementation of the seventh shifting stage by the various exemplary embodiments of FIG. 1.
Figure 9:
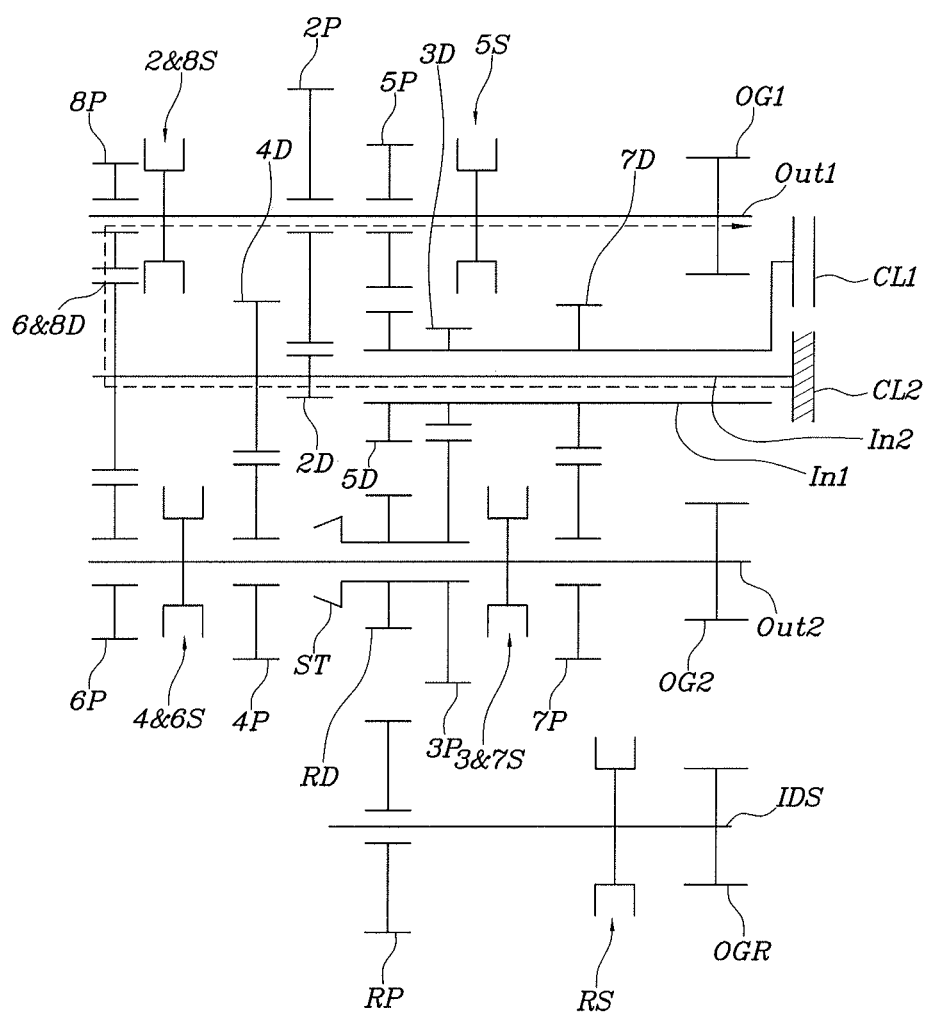
FIG. 9 is a drawing explaining the implementation of the eighth shifting stage by the various exemplary embodiments of FIG. 1.

FIG. 2 explains the implementation state of the first shifting stage.

The power transmitted to the first input shaft IN1 through the first clutch CL1 sequentially passes through the drive gear for the third stage 3D, the driven gear for the third stage 3P, the sleeve synchronizer ST, the driven gear for the fourth stage 4P, the drive gear for the fourth stage 4D, the second input shaft IN2, the drive gear for the second stage 2D, the driven gear for the second stage 2P, the synchronizer for the second stage, the first output shaft OUT1 to form the first shifting stage.

Herein, the sleeve synchronizer ST connects between the driven gear for the third stage 3P and the driven gear for the fourth stage 4P, so that the first input shaft IN1 is connected to the second input shaft IN2 through the drive gear for the third stage 3D, the driven gear for the third stage 3P, the driven gear for the fourth stage 4P and the drive gear for the fourth stage 4D to transmit the power. The power being transmitted from the first input shaft IN1 to the second input shaft IN2 is transmitted with a state shifted at the transmission gear ratio obtained by multiplying a transmission gear ratio between the drive gear for the third stage 3D and the driven gear for the third stage 3P by a transmission gear ratio between the driven gear for the fourth stage 4P and the drive gear for the fourth stage 4D, and then, shifted again at the transmission gear ratio between the drive gear for the second stage 2D and the driven gear for the second stage 2P, so that the shifting to the first stage is achieved.

For reference, the sleeve synchronizer ST includes a synchro mesh mechanism almost the same as the conventional synchronizer, but is configured to be connecting the driven gear for the third stage 3P and the driven gear for the fourth stage 4P while a hub is fixed at the driven gear for the third stage 3P and a sleeve linearly slides to engage with the hub and a clutch gear provided at the driven gear for the fourth stage 4P simultaneously.

Figure 10:
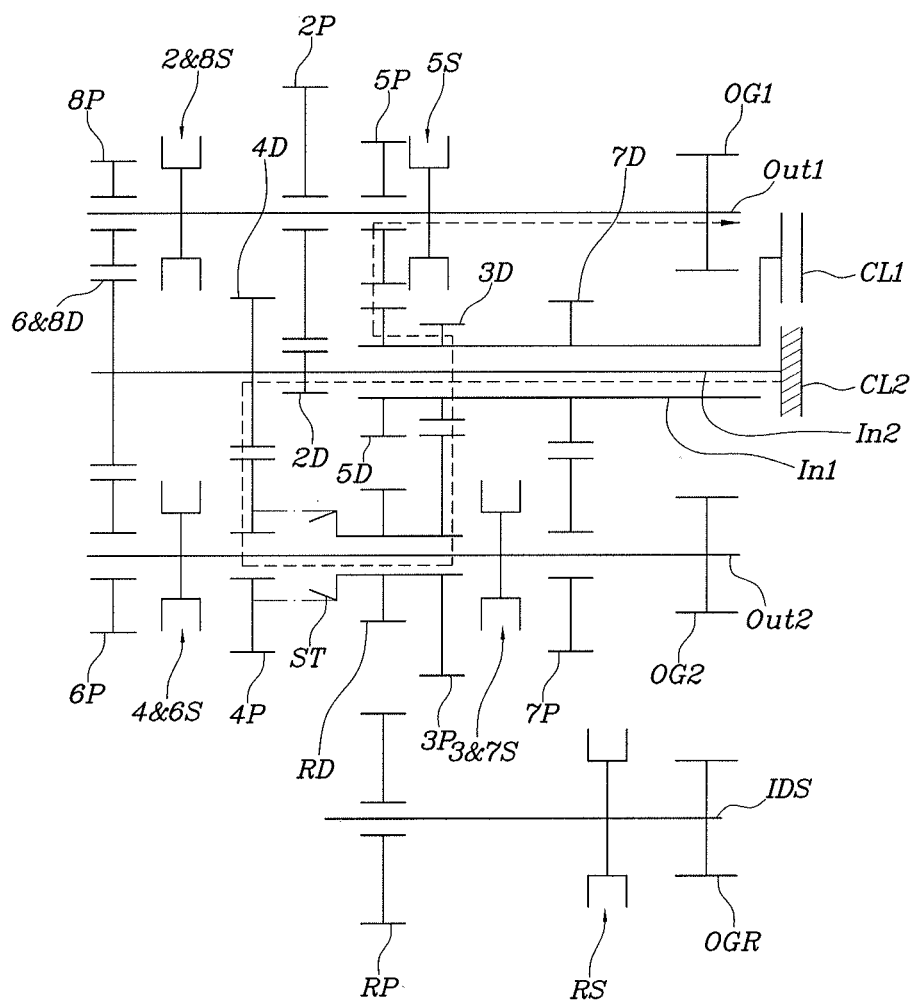
FIG. 10 is a drawing explaining the implementation of an A shifting stage by the various exemplary embodiments of FIG. 1.

FIG. 10 shows a state of implementing the A stage. The power transmitted to the second input shaft IN2 through the second clutch CL2 is transmitted to the drive gear for the fourth stage 4D, the driven gear for the fourth stage 4P, the sleeve synchronizer ST, the driven gear for the third stage 3P, the drive gear for the third stage 3D and the first input shaft IN1, and then, drawn out to the first output shaft OUT1 through the drive gear for the fifth stage 5D, the driven gear for the fifth stage 5P and a synchronizer for a fifth stage 5S to form a transmission gear ratio between the seventh and eighth stages as described.

Figure 11:
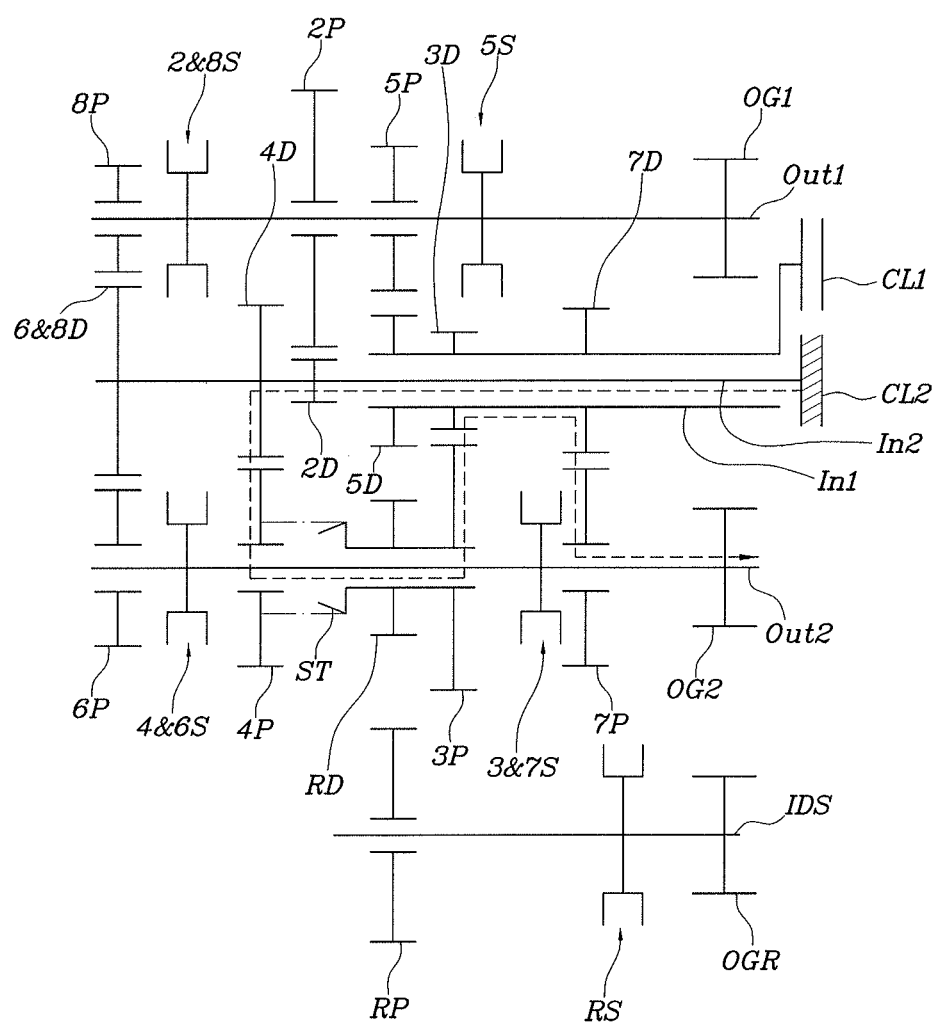
FIG. 11 is a drawing explaining the implementation of a B shifting stage by the various exemplary embodiments of FIG. 1.
Figure 12:
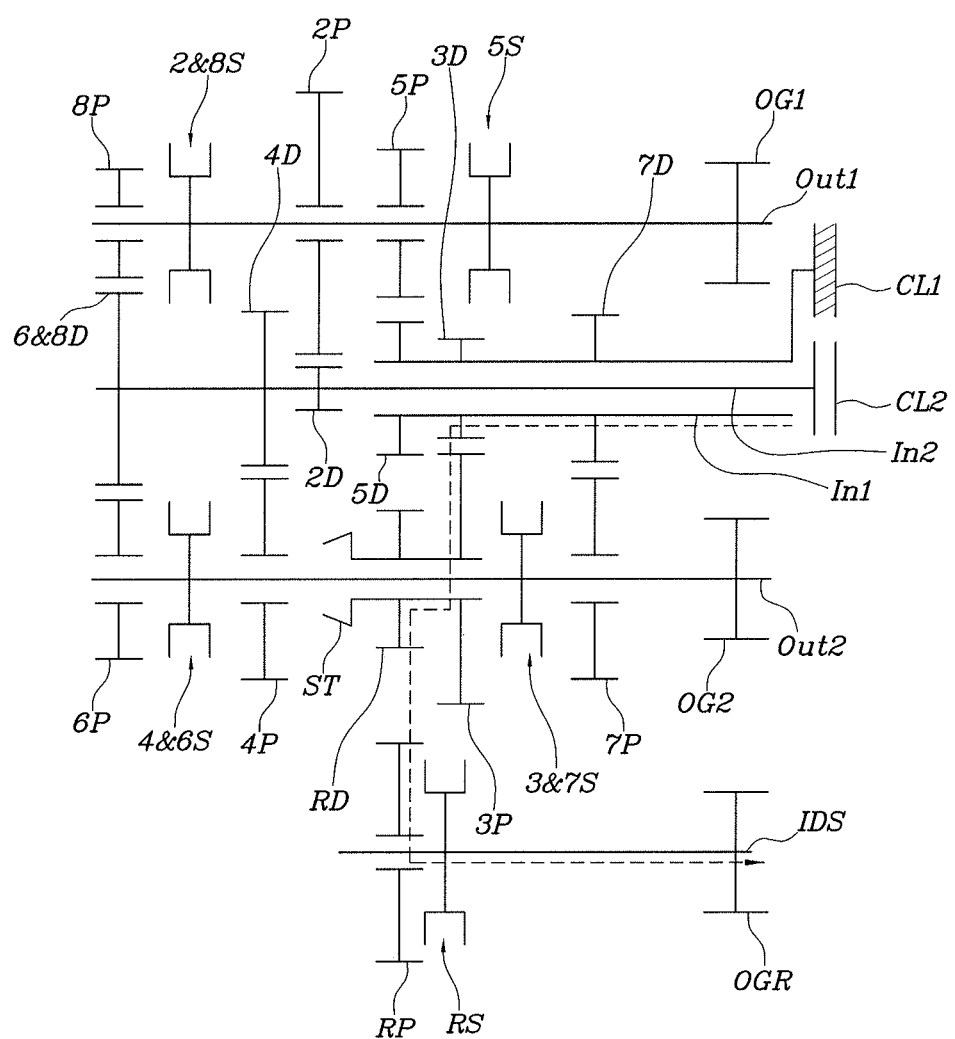
FIG. 12 is a drawing explaining the implementation of the R shifting stage by the various exemplary embodiments of FIG. 1.

FIG. 11 shows a state of implementing the B stage. The power transmitted to the second input shaft IN2 through the second clutch CL2 is transmitted to the first input shaft IN1 through the same path as the path of FIG. 10, and then, transmitted to the second output shaft OUT2 through the drive gear for the seventh stage 7D, the driven gear for the seventh stage 7P and the synchronizer for the third and seventh stage 3&7 to form a transmission gear ration of the ninth stage.

Figure 14:
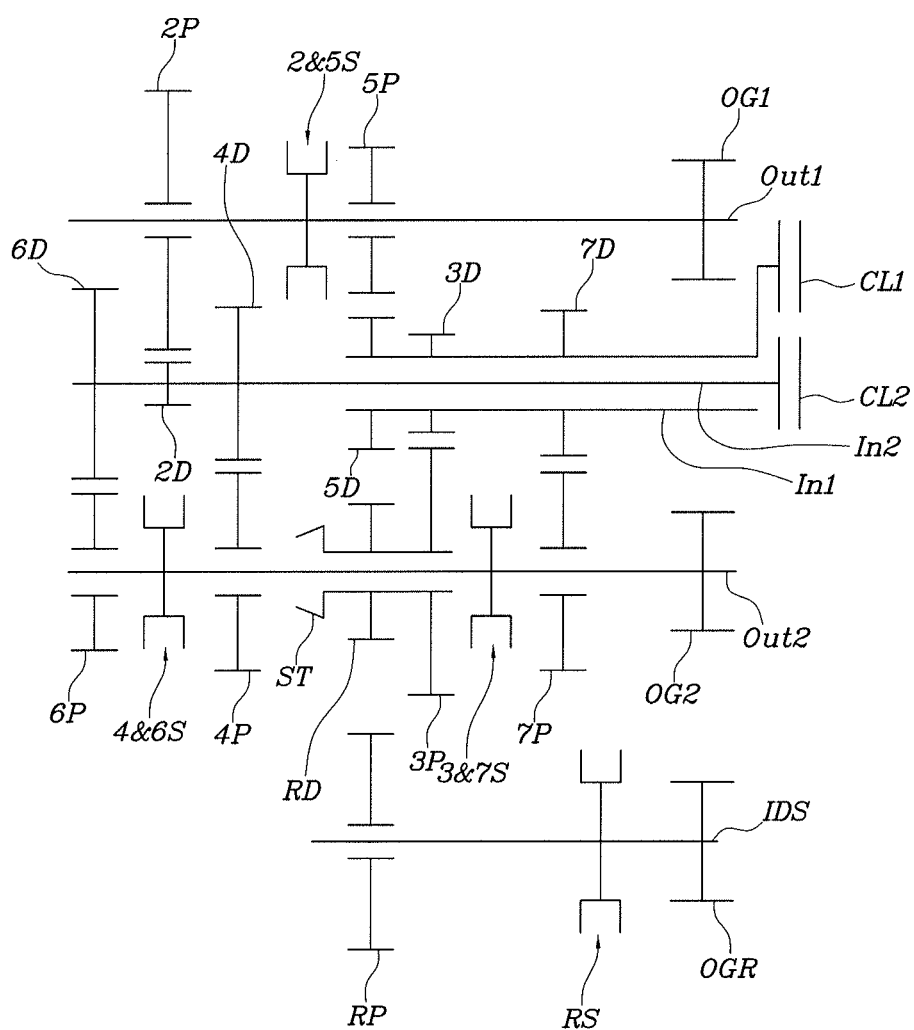
FIG. 14 is a drawing showing the various exemplary embodiments of a DCT for a vehicle according to an exemplary embodiment of the present invention.

FIG. 14 shows another exemplary embodiment of the present invention. Compared to the exemplary embodiment of FIG. 1, the driven gear for the eighth stage 8P and the synchronizer for a fifth stage 5S are removed, and the synchronizer for the fifth stage 5S selectively connects the driven gear for the second stage 2P or the driven gear for the fifth stage 5P to or from the first output shaft OUT1 instead of the synchronizer for the second and eighth stage 2&8S selectively connecting the driven gear for the eighth stage 8P to or from the first output shaft OUT1, implementing forward eight stages while reducing the number of portions.

Of course, the eighth shifting stage is configured to be implemented to the A stage or the B stage and the like.

The present invention as described above can reduce the whole length of the DCT by not preparing a separate drive gear for a shifting stage and driven gear for a shifting stage for the lowest shifting stage and the highest shifting stage and contribute to the improvement of fuel efficiency of the vehicle by providing relatively many shifting stages.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the various exemplary embodiments with respect to the positions of such features as displayed in the figures. It is to be further understood that the term "connect" or its derivatives refer both to direct and indirect connection.

The foregoing descriptions of predetermined exemplary embodiments of the present invention have been presented for purposes of illustration and description. They are not intended to be exhaustive or to limit the present invention to the precise forms disclosed, and obviously many modifications and variations are possible in light of the above teachings. The various exemplary embodiments were chosen and described to explain predetermined principles of the present invention and their practical application, to be configured for others skilled in the art to make and utilize various exemplary embodiments of the present invention, as well as alternatives and modifications thereof. It is intended that the scope of the present invention be defined by the Claims appended hereto and their equivalents.

What is claimed is:

1. A dual-clutch transmission (DCT) for a vehicle, the DCT comprising:
    a first input shaft and a second input shaft mounted concentrically to the first input shaft;
    a first clutch mounted to the first input shaft to selectively transmit power to the first input shaft;
    a second clutch mounted to the second input shaft to selectively transmit power to the second input shaft;
    a first output shaft and a second output shaft each mounted in parallel with the first input shaft and the second input shaft;
    an input shaft connection device provided to selectively connect between the first input shaft and the second input shaft by use of a selection output shaft, which is one of the first output shaft and the second output shaft;
    a plurality of drive gears mounted on and rotated with the first input shaft and the second input shaft; and
    a plurality of driven gears mounted on the first output shaft and the second output shaft engaged with the plurality of drive gears to form each shifting stage of shifting stages,
    wherein the plurality of driven gears is rotatable on the first output shaft and the second output shaft,
    wherein predetermined drive gears among the plurality of drive gears and predetermined driven gears among the plurality of driven gears are mounted to implement remaining shifting stages except for a lowest shifting stage having a greatest transmission shift ratio and a highest shifting stage having a smallest transmission shift ratio among a series of the shifting stages, and wherein the lowest shifting stage and the highest shifting stage are implemented by use of remaining drive gears among the plurality of drive gears and remaining driven gears among the plurality of driven gears while the input shaft connection device connects the first input shaft and the second input shaft.

2. The DCT for the vehicle of claim 1, wherein a plurality of synchronizers for the shifting stages are mounted on the first output shaft and the second output shaft for selectively connecting the plurality of driven gears to or from the first output shaft or the second output shaft.

3. The DCT for the vehicle of claim 2, wherein the input shaft connection device includes a sleeve synchronizer provided to selectively connect between two driven gears among the plurality of driven gears, the two driven gears mounted adjacent to each other on the selection output shaft, and wherein the sleeve synchronizer is not included in the plurality of synchronizers.

4. The DCT for the vehicle of claim 1, wherein the first input shaft is provided with first drive gears of the predetermined drive gears for implementing odd shifting stages of the series of the shifting stages among the plurality of drive gears, wherein the second input shaft is provided with second drive gears of the predetermined drive gears for implementing even shifting stages of the series of the shifting stages, wherein the selection output shaft is the second output shaft, and wherein a sleeve synchronizer is mounted to selectively connect between first driven gears of the predetermined driven gears mounted on the second output shaft for implementing the odd shifting stages and second driven gears of the predetermined driven gears mounted on the second output shaft for implementing the even shifting stages.

5. The DCT for the vehicle of claim 4, wherein the first drive gears of the predetermined drive gears includes a drive gear for a third stage of the odd shifting stages, a drive gear for a fifth stage of the odd shifting stages, and a drive gear for a seventh stage of the odd shifting stages, wherein the second drive gears of the predetermined drive gears include a drive gear for a second stage of the even shifting stages, a drive gear for a fourth stage of the even shifting stages, and a drive gear for a sixth and eighth stage of the even shifting stages, wherein the predetermined driven gears includes a driven gear for the second stage of the even shifting stages, a driven gear for the third stage of the odd shifting stages, a driven gear for the fourth stage of the even shifting stages, a driven gear for the fifth stage of the odd shifting stages, a driven gear for the sixth stage of the even shifting stages, a driven gear for the seventh stage of the odd shifting stages, and a driven gear for the eighth stage of the even shifting stages, wherein the first input shaft is provided with the drive gear for the third stage, the drive gear for the fifth stage and the drive gear for the seventh stage, wherein the second input shaft is provided with the drive gear for the second stage, the drive gear for the fourth stage and the drive gear for the sixth and eighth stage, wherein the first output shaft is provided with the driven gear for the second stage, the driven gear for the fifth stage and the driven gear for the eighth stage, and wherein the second output shaft is provided with the driven gear for the third stage, the driven gear for the fourth stage, the driven gear for the sixth stage and the driven gear for the seventh stage.

6. The DCT for the vehicle of claim 5, wherein the sleeve synchronizer is mounted to selectively connect between the driven gear for the third stage and the driven gear for the fourth stage.

7. The DCT for the vehicle of claim 5, wherein the plurality of synchronizers includes:

a first synchronizer mounted on the first output shaft for selectively connecting the driven gear for the fifth stage to or from the first output shaft;

a second synchronizer for the second and eighth stage mounted on the first output shaft for selectively connecting the driven gear for the second stage or the driven gear for the eighth stage to or from the first output shaft;

a third synchronizer for the third and seventh stage mounted on the second output shaft for selectively connecting the driven gear for the third stage or the driven gear for the seventh stage to or from the second output shaft; and a fourth synchronizer for the fourth and sixth stage mounted on the second output shaft for selectively connecting the driven gear for the fourth stage or the driven gear for the sixth stage to or from the second output shaft.

8. The DCT for the vehicle of claim 1, further including:

a reverse idler shaft mounted in parallel with the second output shaft;

a reverse driven gear mounted on the reverse idler shaft; and a reverse synchronizer provided to selectively connect the reverse driven gear to or from the reverse idler shaft.

* * * * *